United States Patent
Kupper et al.

(10) Patent No.: US 7,438,666 B2
(45) Date of Patent: Oct. 21, 2008

(54) GEARBOX ACTUATION SYSTEM AND METHOD FOR ADJUSTING A GEARBOX ACTUATION SYSTEM

(75) Inventors: Klaus Kupper, Buhl (DE); Klaus Henneberger, Buhl (DE); Jorg Metzger, Buhlertal (DE); Reinhard Berger, Buhl (DE); Frank Stengel, Buhl-Neusatz (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 202 days.

(21) Appl. No.: 10/711,848

(22) Filed: Oct. 8, 2004

(65) Prior Publication Data

US 2005/0081663 A1 Apr. 21, 2005

Related U.S. Application Data

(63) Continuation of application No. PCT/DE03/01183, filed on Apr. 10, 2003.

(30) Foreign Application Priority Data

Apr. 10, 2002 (DE) .............................. 102 15 715
Sep. 5, 2002 (DE) .............................. 102 41 068

(51) Int. Cl.
    *B60W 10/10* (2006.01)

(52) U.S. Cl. ...................................... 477/115; 74/473.1
(58) Field of Classification Search ................. 477/115; 74/473.1
    See application file for complete search history.

(56) References Cited

U.S. PATENT DOCUMENTS

| | | | | | |
|---|---|---|---|---|---|
| 5,222,404 | A | * | 6/1993 | Stine | 74/335 |
| 5,408,898 | A | * | 4/1995 | Steeby et al. | 74/473.1 |
| 5,758,543 | A | * | 6/1998 | Bair | 74/473.36 |
| 5,861,803 | A | * | 1/1999 | Issa | 340/456 |
| 6,874,381 | B2 | * | 4/2005 | Berger et al. | 74/335 |
| 2002/0125094 | A1 | | 9/2002 | Zimmermann et al. | |
| 2002/0156562 | A1 | | 10/2002 | Berger et al. | |

FOREIGN PATENT DOCUMENTS

| | | |
|---|---|---|
| EP | 0599511 B1 | 2/1997 |
| WO | WO 98/54491 | 12/1998 |

* cited by examiner

*Primary Examiner*—Ha D. Ho
(74) *Attorney, Agent, or Firm*—Simpson & Simpson, PLLC

(57) ABSTRACT

The invention relates to a method for adjusting the gearbox actuation system of an automatic gearbox of a vehicle, whereby at least one reference travel is made with the gear engaged. The invention further relates to a gearbox actuation system for selecting and engaging gears in an automatic gearbox of a vehicle, especially for carrying out the inventive method, whereby at least one reference travel is made for the purpose of adjustment.

14 Claims, 1 Drawing Sheet

GEARBOX ACTUATION SYSTEM AND METHOD FOR ADJUSTING A GEARBOX ACTUATION SYSTEM

CROSS-REFERENCE TO RELATED APPLICATIONS

This application is filed under 35 U.S.C. §120 and §365(c) as a continuation of International Patent Application PCT/DE03/01183, filed Apr. 10, 2003, which application is incorporated herein by reference. This application also claims priority of German Patent Applications 102 15 715.4, filed Apr. 10, 2002, and 102 41 068.2 filed Sep. 5, 2002, which applications are incorporated herein by reference.

BACKGROUND OF THE INVENTION

This invention relates to a gearbox actuation system and a method for adjusting a gearbox actuation system in an automated gearbox of a vehicle.

Automated gearboxes such as, for example, XSG gear systems (ASG [automated gearboxes], PSG [parallel gearboxes], etc.), are being installed in vehicles with increasing frequency. The gearbox actuation system of such gearboxes can be operated regularly or irregularly, for example, in case of a defect or a presumed defect against certain reference points. This start to the reference points is used to adjust or reference the sensor system, in particular, the incremental travel sensor system. Furthermore, this start to the reference points can be done in a "probing" fashion. This procedure is employed preferably when the exact position of the actuation system within the available movement space, as a rule, the H wiring diagram of a mechanical gearbox, is not known. The reference points are started within the neutral gap so that one must make absolutely sure that the engine is not in gear.

OBJECT OF THE INVENTION

The object of the invention is to provide a gearbox actuation system and a method for adjusting a gearbox actuation system of an alternated gearbox of a vehicle in such a way that it will not be required to disengage the current particular gear to adjust the gearbox actuation system.

This problem is solved in a methodical fashion by a process for adjusting the gearbox actuation system of an automated gearbox of a vehicle where at least one reference travel is performed with the gear engaged.

BRIEF SUMMARY OF THE INVENTION

According to the invention, it may be provided that the gearbox actuation system is so made that one starts a reference point in the neutral gap without at the same time moving the particular selector forks and gearshift rails. This means that during the reference travel in the neutral gap, the gearshift fork is not necessarily moved at the same time so that the current gear need not have to be disconnected.

The essential advantage of the invention resides in the following—with the engine in gear, and thus not noticeable as far as the driver is concerned, there can be referencing or an adjustment of the gearbox actuation system or its measurement systems.

As part of a development of the invention, the gearshift rails can form a gap with their gearshift jaws in which the shift finger can move regardless of whether the engine is in gear. If a reference travel is now started from that situation, the shift finger can move laterally in the direction of the N-gap and at the same time can probe periodically upward and downward until a resistance can be detected. If this resistance is eliminated, then the shift finger, in other words, in this case, can move upward over the entire neutral gap width, for example, to an opposite reference point.

The selected direction can thus already be adjusted. The concluding adjustment in the gearshift direction, for example, can be performed according to a next development of the invention in a recess or the like especially provided for this purpose.

A further development of the invention can provide that the shift finger, after referencing, again returns to its position prior to the reference travel. Suitable logics should be determined in case of an unknown starting point in order to establish in which gearshift direction the initial movement is to take place.

A further development of the invention at hand can propose that the mentioned probing routine be performed regularly or irregularly in combination with the mentioned gearshift jaw geometries.

The method proposed according to the invention can be employed especially in automated gearboxes and in parallel gearboxes with the so-called active interlock actuation system.

Furthermore, the problem constituting the basis of the invention is solved by an invention-based gearshift actuation box, in particular, for implementing the proposed method, where at least one reference travel is provided for adjustment purposes.

According to a development of the invention, the gearshift jaws on the gearshift rails can be so made that the neutral gap during the reference travel is attained by the shift finger without the current gear having to be disengaged.

Preferably, the gearshift jaws of the gearshift rails that are arranged parallel to each other will form a gap in which the shift finger can be moved during the reference travel regardless of whether the engine is in gear.

According to a development of the invention, the provided gap can be supplied for the purpose of adjustment in the direction of selection. At least one recess can be considered for the purpose of adjustment in the gearshift direction.

Locking the individual gearshift rails is helpful or necessary in order to keep the last gear that was put in also engaged when the shift finger does not take care of arresting the gearshift rail.

Preferably, in the invention-based gearshift actuation system, one can provide, for example, a brushless electric motor or the like as the selection and/or gearshift motor.

BRIEF DESCRIPTION OF THE DRAWINGS

Other advantages and advantageous developments will result from the subclaims and the accompanying figure of the invention, in which:

DETAILED DESCRIPTION OF THE INVENTION

Figure 1:
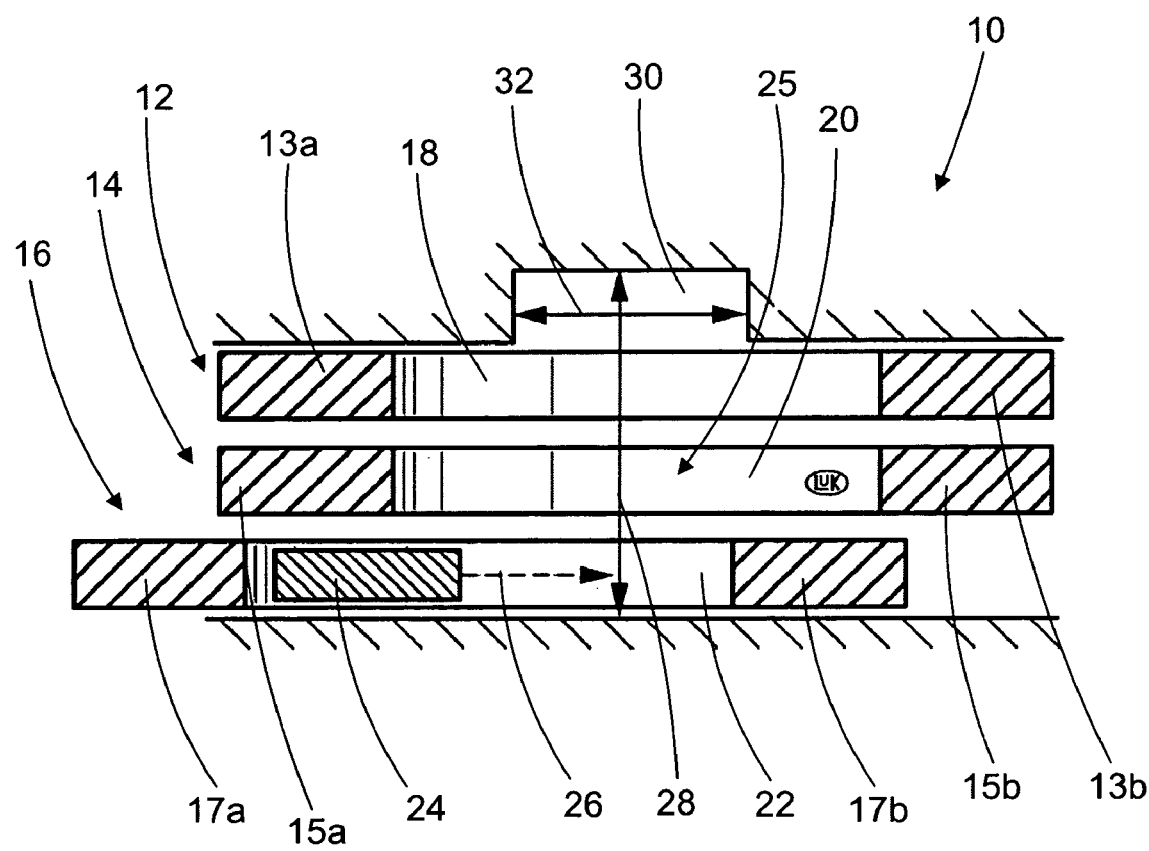
FIG. 1 is a cross sectional view of the present invention automated gearbox.

FIG. 1 shows automated gearbox 10 having three gearshift rails 12, 14 and 16, each comprising respective gearshift jaws 13a, 13b, 15a, 15b, 17a and 17b. Gearshift jaws 13a and 13b of gearshift rail 12 form opening 18, gearshift jaws 15a and 15b of gearshift rail 14 form opening 20, while gearshift jaws 17a and 17b of gearshift rail 16 form opening 22. Thus, the gearshift jaws of gearshift rails 12, 14 and 16 form gap 25, i.e., the gap formed by openings 18, 20 and 22. Shift finger 24, not shown in any further detail, can be moved within gap 25, regardless of whether or not the engine is in gear, for example, in the direction of arrow 26 and/or first bi-directional arrow 28. In the embodiment shown in FIG. 1, specific gears are associated with each particular gearshift rail 12, 14 and 16, e.g., first and second gears may be associated with rail 12, third and fourth gears may be associated with rail 14, while fifth and reverse gears may be associated with rail 16.

When a reference travel is started, shift finger 24 can move laterally in the direction of the N-gap, or in other words the neutral gap, and at the same time can probe periodically upward and downward until a resistance becomes detectable. In FIG. 1, lateral movement is indicated by arrow 26, while upward and downward movement is indicated by first bi-directional arrow 28. Once this resistance is eliminated, then shift finger 24 can be moved upward over the entire neutral gap width, i.e., through gap 25, and an opposite reference point can possibly be reached. The direction of selection can thus be adjusted. The concluding adjustment in the gearshift direction, for example, can be performed in recess 30 that is specially provided for this purpose. After referencing the shift finger again returns to its position prior to the reference travel.

The patent claims submitted with the application are formulation proposals without regard to the attainment of additional patent protection. Applicant reserves the right to claim additional feature combinations that are so far disclosed only in the description and/or drawings.

References, used in the subclaims, point to the additional development of the object of the main claim by means of the features of the particular subclaim; they are not to be understood as a waiver of the attainment of an independent, objective protection for the feature combinations of the referenced subclaims.

The object of the subclaims can form separate and independent inventions with a view to the state of the art on the priority date; therefore, applicant reserves the right to make them into an object of independent claims or partial declarations.

They can furthermore also contain independent inventions that display a design independent of the objects of the preceding subclaims.

The exemplary embodiments are not to be construed as a restriction of the invention. Instead, numerous changes and modifications are possible in the context of the disclosure on hand, especially those variants, elements and combinations and/or materials that, for example, by combination or modification of individual features or elements or process steps in conjunction with those described in the general description and embodiments as well as the claims and contained in the drawings, can be preferred by the expert with a view to the solution of the problem and that by means of features that can be combined lead to a new object or to new process steps or new process step sequences also to the extent that they relate to production, testing and working processes.

What is claimed is:

1. A gearbox actuation system for selecting and shifting gears in an automated gearbox of a vehicle comprising:
    a shift finger;
    a plurality of gearshift rails, each rail in the plurality of gearshift rails in a respective position;
    a neutral gap with a first portion formed by respective jaws for said each rail and with a second portion formed separate from the respective jaws and open to the first portion; and,
    a gearshift motor, wherein the motor is arranged to move the shift finger in a reference travel from a reference point in the first portion to the second portion and wherein during the movement of the shift finger from the reference point in the first portion to the second portion, said each rail remains in the respective position.

2. The gearbox actuation system of claim 1 wherein said shift finger is moved laterally toward said neutral gap and, simultaneously, said at least one reference point is started periodically upward and downward.

3. The gearbox actuation system of claim 2 wherein a direction of selection is adjusted when said shift finger is moved over an entire width of said neutral gap.

4. The gearbox actuation system of claim 1 wherein an adjustment in a gearshift direction is performed parallel to said gearshift rails by means of the second portion of the neutral gap.

5. The gearbox actuation system of claim 1 wherein said shift finger is moved back to a starting position prior to reference travel after referencing.

6. The gearbox actuation system of claim 1 wherein said reference travel is performed regularly or irregularly.

7. The gearbox actuation system according to claim 1 wherein said gearshift jaws and said gearshift rails are configured such that said neutral gap can be reached during said reference travel without a current gear being disconnected.

8. The gearbox actuation system according to claim 1 wherein said shift finger is configured to be moved within said gap during said reference travel regardless of gear engagement.

9. The gearbox actuation system according to claim 8 wherein said gap is provided for purposes of adjustment in the direction of selection.

10. The gearbox actuation system according to claim 4 wherein said second portion of the neutral gap is provided for adjustment in the gearshift direction.

11. The gearbox actuation system according to claim 1 wherein said gearshift rails have a catch in order to hold a last gear engaged also in an engaged state.

12. The gearbox actuation system according to claim 1 wherein the gearshift motor comprises at least one brushless electric motor for selection and/or shifting.

13. A gearbox actuation system for selecting and shifting gears in an automated gearbox of a vehicle comprising:
    a shift finger;
    a plurality of gearshift rails;
    a neutral gap with a first portion formed by respective jaws for said each rail and with a second portion formed separate from the respective jaws and open to the first portion; and,
    a gearshift motor, wherein the motor is arranged to move the shift finger in a reference travel from a reference point in the first portion to the second portion.

14. A gearbox actuation system for selecting and shifting gears in an automated gearbox of a vehicle comprising:
    a shift finger;
    a plurality of gearshift rails;
    a neutral gap with a first portion formed by respective jaws for said each rail and with a second portion formed separate from the respective jaws and open to the first portion; and,
    a gearshift motor, wherein the motor is arranged to move the shift finger in a reference travel from a reference point in the first portion to the second portion and back to the reference position.

* * * * *